United States Patent
Coburn

[15] 3,678,061
[45] July 18, 1972

[54] 2,6-BIS(PICRYLAMINO)-3,5-DINITROPYRIDINE AND A METHOD FOR ITS PREPARATION

[72] Inventor: Michael D. Coburn, Los Alamos, N. Mex.

[73] Assignee: The United States of America as represented by the United States Atomic Energy Commission

[22] Filed: March 26, 1971

[21] Appl. No.: 128,521

[52] U.S. Cl. .................................260/297 R, 149/82
[51] Int. Cl. .........................................C07d 31/42
[58] Field of Search ...............................260/296 R

[56] References Cited

OTHER PUBLICATIONS

Peters, Chem. Abstracts, Vol. 72, (15), Item No. 78,823- b, Apr. 1970

*Primary Examiner*—Alan L. Rotman
*Attorney*—Roland A. Anderson

[57] ABSTRACT

The heat resistant high explosive 2,6-bis(picrylamino)-3,5-dinitropyridine is readily prepared in good yield by first reacting 2,6-diaminopyridine with picryl chloride in a polar, aprotic solvent such as N,N-dimethylformamide, in the presence of sodium fluoride and then nitrating the resultant intermediate 2,6-bis-(picrylamino)pyridine.

3 Claims, No Drawings

2,6-BIS(PICRYLAMINO)-3,5-DINITROPYRIDINE AND A METHOD FOR ITS PREPARATION

BACKGROUND OF THE INVENTION

The invention described herein was made in the course of, or under, a contract with the U. S. Atomic Energy Commission. It relates to a method of preparing 2,6-bis(picrylamino)-3,5-dinitropyridine.

SUMMARY OF THE INVENTION

The compound 2,6-bis(picrylamino)-3,5-dinitropyridine is a moderately powerful explosive that is more thermally stable than any other explosive of comparable oxygen balance thus far reported. In addition to being chemically inert, the material has no vapor pressure at high temperatures. The compound is easily prepared in good yield from relatively inexpensive, commercially available starting materials. The process involves the reaction of one molar equivalent of 2,6-diaminopyridine with two molar equivalents of picryl chloride in a polar, aprotic solvent, such as N,N-dimethylformamide, to produce the intermediate 2,6-bis(picrylamino)pyridine, which is subsequently nitrated to the title compound. The addition of sodium fluoride to the reaction mixture doubles the yield of 2,6-bis(picrylamino)pyridine.

DESCRIPTION OF THE PREFERRED EMBODIMENT

The compounds 2,6-diaminopyridine (10.9 g, 0.1 mole), picryl chloride (54.0 g, 0.022 mole), and sodium fluoride (20.0 g, 0.48 mole) are added to anhydrous N, N-dimethylformamide (200 ml). The resulting mixture is heated at 115° C. for 5 hr, then poured into 2 l of water with rapid stirring. The solid is collected by filtration, washed with water, and digested for 30 min in 2 l of boiling methanol. The product is removed by filtration, washed with methanol, and dried in an oven at 100° C. for 16 hr. The yield of crude 2,6-bis(picrylamino)pyridine is 46–48 g (87–90%). Analytically pure material, mp 300° (dec) can be obtained by recrystallization from acetone-ethanol.

Anal. Calcd. for $C_{17}H_9N_9O_{12}$:
 C, 38.43; H, 1.71; N, 23.73.
Found: C, 38.07; H, 1.96; N, 23.77.

If the sodium fluoride is omitted from the reaction mixture, the yield of product is reduced to 40–50 percent. The function of the sodium fluoride is to convert the picryl chloride to picryl fluoride, which is much more reactive than picryl chloride toward nucleophilic substitution.

The crude 2,6-bis(picrylamino)pyridine (50 g, 0.94 mole) is then added to 500 of fuming nitric acid (90 percent $HNO_3$) with stirring at −20°. The resulting solution is allowed to warm to 25°, stirred at 25° for 1 hr, then heated under reflux for 5 hr, cooled, and diluted with 1 l of concentrated nitric acid (70 percent $HNO_3$). The mixture is chilled to 0°, the product is removed by filtration and washed with concentrated nitric acid. The filter cake is washed repeatedly with water, then with methanol, and dried in an oven at 150° C. The yield of pure 2,6-bis(picrylamino)-3,5-dinitropyridine is 39–41 g (67–70 percent).

Anal. Calcd. for $C_{17}H_7N_{11}O_{16}$:
 C, 32.86; H, 1.14; N, 24.80.
Found: C, 32.96; H, 1.35; N, 25.13.

The explosive produced according to the foregoing method has the following characteristics:

| | |
|---|---|
| Melting Point | 360°C |
| Differential Thermal Analysis | Stable to 350°C |
| Vacuum Stability | 0.1 ml/g/48 hr at 200°C |
| | 0.9 ml/g/48 hr at 250°C |
| | 0.5 ml/g/hr at 300°C |
| Thermal Gravimetric Analysis | No weight loss in 24 hr at 250°C |
| | 1% weight loss in 24 hr at 300°C |
| Impact Sensitivity* | 63 cm |
| Spark Sensitivity | 1.175 joule, 3-mil foil |
| Oxidant Balance ($OB_{100}$) | −1.45 |
| Crystal Density | 1.77 g/cc |
| C-J Pressure (calc) | 242 kbar |
| Detonation Velocity (calc) | 7448 m/sec |

*Determined with the Los Alamos Scientific Laboratory Type 12 machine (2.5 kg weight, sample on sandpaper). The 50 percent points of several common explosives are: PETN, 11 cm; RDX, 23 cm; TNT, 160 cm.

What I claim is:

1. The compound 2,6-bis(picrylamino)-3,5-dinitropyridine having the structural formula

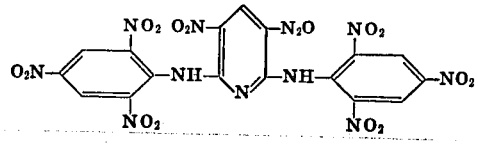

2. A method of preparing 2,6-bis(picrylamino)-3,5-dinitropyridine which consists of first reacting 2,6-diaminopyridine with picryl chloride in a polar, aprotic solvent and then nitrating the resultant intermediate 2,6-bis(picrylamino)-pyridine with an excess of fuming nitric acid at about −20 C.

3. The method of claim 2 wherein the 2,6-diaminopyridine is reacted with picryl chloride in a polar, aprotic solvent in the presence of sodium fluoride.

* * * * *